(No Model.)
T. ROSS.
PORTABLE FIRE ESCAPE.
No. 434,888. Patented Aug. 19, 1890.
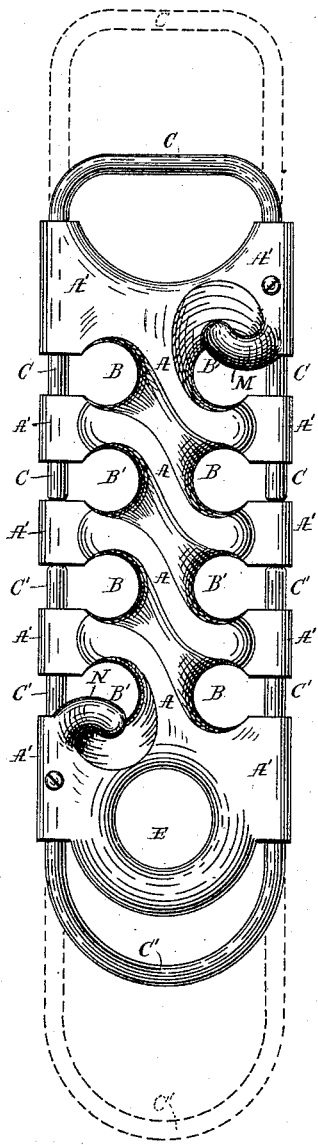
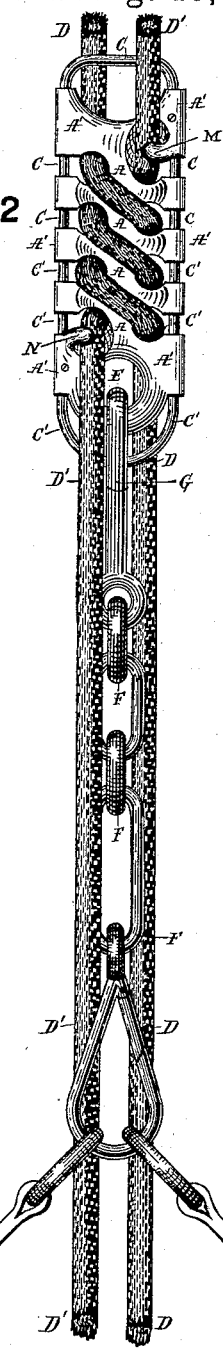
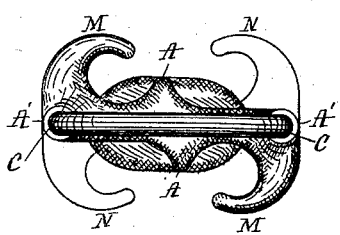
FIG.1
FIG.2
FIG.3
Witnesses
Lillie Hanna
Geo. H. Knight Jr.
Inventor
Thomas Ross
By Knight Bros
Attys.

UNITED STATES PATENT OFFICE.

THOMAS ROSS, OF SYDNEY, NEW SOUTH WALES.

PORTABLE FIRE-ESCAPE.

SPECIFICATION forming part of Letters Patent No. 434,888, dated August 19, 1890.

Application filed December 30, 1889. Serial No. 335,391. (No model.) Patented in New South Wales April 1, 1889, No. 1,329, and in Victoria April 2, 1889, No. 6,650.

*To all whom it may concern:*

Be it known that I, THOMAS ROSS, a subject of the Queen of Great Britain and Ireland, and a resident of Sydney, county of Cumberland, in the Colony of New South Wales, Australia, have invented certain Improvements in Portable Apparatus to be used in Escaping from Burning Buildings, (for which patents were granted in New South Wales dated April 1, 1889, No. 1,329, and in Victoria dated April 2, 1889, No. 6,650,) of which the following is a specification.

The apparatus, which may be composed of any suitable material, consists of a central shaft, around which are formed parallel helical grooves. Projecting from two sides of the central shaft are wings in which openings are made for the purpose of admitting two cords or ropes down which the apparatus is intended to slide. The apparatus thus constructed forms a flattened friction-block. The openings in the wings are undercut so as to furnish a secure seat for the ropes, which are thus enabled to lie snug and close to the central shaft. As a further security against the ropes slipping from the grooves, sliding safety-guards are placed in the two wings of the block. As soon as the ropes are coiled round the helical grooves on the central shaft the safety-guards are pushed down, and the ropes will thus be effectually prevented from leaving the grooves. The bottom of the block is formed into a ring, which sustains a chain to which slip-rings or spring-clips attached to a sling or belt may be secured.

In order to make use of the apparatus in escaping from the window of a burning building, one end of a double cord should be made fast to a hook or ring within the room and the other end of the rope dropped out of the window. The safety-guards on the block should be withdrawn, so as to leave the helical grooves on the block open. The double rope should then be threaded onto the grooves and the safety-guards closed. The escaper must place the sling or strap round his body under the armpits and secure it by the spring-clips to the ring on the chain hanging from the block, and then cast himself from the window. The friction of the double rope passing round the helical grooves on the block will prevent the passenger from falling too fast, but will enable him to descend toward the ground at a gentle pace. In certain cases—for instance, when flames are issuing from windows that the passenger would have to pass while descending the rope, it would be advisable before descending to have the rope led to some point at a distance from the façade of the building, say to the other side of the street. In this case the passenger would not descend the rope vertically, but at an angle with the façade of the building. This would be likely to cause the rope to jam against the angles formed at the point where the side wings are cut away to permit the rope to be threaded onto the block. In order to overcome this difficulty, curved fingers or guides are formed on the wings of the block at the commencement and termination of the grooves.

In the accompanying drawings, Figure 1 is an elevation of the block, showing the curved retaining-fingers at the beginning and end of the helical grooves, the withdrawn position of the guards being shown by dotted lines. Fig. 2 shows the whole apparatus complete as in the act of descending from the window of a burning building; and Fig. 3 is a top view of the block, the fingers at the upper end of the block being shaded, while the lower fingers are merely shown in outline.

A A is the central block, around which are formed the grooves B B'. A' A' are the wings projecting from the same. As will be seen from the drawings, the grooved wings are undercut so as to form channels in which the ropes may slide.

C C' are the safety-guards, which in Fig. 1 may be seen drawn out to the position shown by dotted lines, so as to leave the grooves open for the reception of the ropes.

In Fig. 2, D D' are the ropes.

E is the ring or loop at the bottom of the block, to which the chain F is secured by a slip-ring or spring-clip G. Hooked onto the lower extremity of the chain by a similar clip is the sling or strap H for sustaining the passenger.

Fig. 3 shows the recess formed by the fingers, so as to prevent the rope from slipping away from the grooves and jamming, should it be considered desirable for the passenger to decend the rope in a diagonal direction.

Having now particularly described and ascertained the nature of my said invention and in what manner the same is to be performed, I declare that what I claim is—

In a portable fire-escape, the combination of a grooved friction-block, such as that described, with the curved fingers that will prevent the ropes slipping from the grooves when the passenger is descending at an angle, as described.

THOMAS ROSS.

Witnesses:
MANFIELD NEWTON,
J. S. WHITELOCKE.